United States Patent [19]

Pocock et al.

[11] Patent Number: 4,525,401
[45] Date of Patent: Jun. 25, 1985

[54] PLASTIC CONTAINER WITH INTERNAL RIB REINFORCED BOTTOM

[75] Inventors: John F. E. Pocock, Neu-Isenburg, Fed. Rep. of Germany; Gautam K. Mahajan; Suppayan M. Krishnakumar, both of Nashua, N.H.; Kenneth F. M. Friendship, Clarendon Hills, Ill.

[73] Assignee: The Continental Group, Inc., New York, N.Y.

[21] Appl. No.: 99,057

[22] Filed: Nov. 30, 1979

[51] Int. Cl.³ ............................................. B32B 3/02
[52] U.S. Cl. .................................... 428/64; 215/1 C; 220/70
[58] Field of Search ............. 215/1 C; 220/70; 428/35, 64, 1

[56] References Cited

U.S. PATENT DOCUMENTS

| | | | |
|---|---|---|---|
| 3,043,461 | 7/1962 | Glassco | 215/1 C |
| 3,137,748 | 6/1964 | Makowski | 264/97 |
| 3,468,443 | 9/1969 | Marcus | 215/1 C |
| 3,757,978 | 9/1973 | Gilbert | 215/1 C |
| 3,870,181 | 3/1975 | Sincock | 215/1 C |
| 3,871,541 | 3/1975 | Adomaitis | 215/1 C |
| 3,881,621 | 5/1975 | Adomaitis | 215/12 R X |
| 3,900,120 | 8/1975 | Sincock | 215/1 C |
| 3,935,955 | 2/1976 | Das | 215/1 C |
| 3,956,441 | 5/1976 | Uhlig | 264/89 |
| 3,961,113 | 6/1976 | Marco | 428/35 |
| 4,005,245 | 1/1977 | Edwards | 428/542 |
| 4,024,975 | 5/1977 | Uhlig | 215/1 C |
| 4,108,324 | 8/1978 | Krishnakumar et al. | 215/1 C |
| 4,134,510 | 1/1979 | Chang | 215/1 C |
| 4,151,249 | 4/1979 | Lee | 264/520 |
| 4,170,622 | 10/1979 | Uhlig | 264/520 |
| 4,174,782 | 11/1979 | Obsomer | 215/1 C |
| 4,261,948 | 4/1981 | Krishnakumar et al. | 264/532 |

FOREIGN PATENT DOCUMENTS

| | | |
|---|---|---|
| 882497 | 3/1943 | France . |
| 1436468 | 3/1966 | France . |
| 158253 | 11/1978 | Japan . |
| 1114304 | 5/1968 | United Kingdom . |
| 1161572 | 8/1969 | United Kingdom . |
| 1177875 | 1/1970 | United Kingdom . |
| 1239531 | 7/1971 | United Kingdom . |
| 1360107 | 7/1974 | United Kingdom . |
| 1406958 | 9/1975 | United Kingdom . |
| 1441657 | 7/1976 | United Kingdom . |
| 1528512 | 10/1978 | United Kingdom . |
| 2034663 | 6/1980 | United Kingdom . |

Primary Examiner—John E. Kittle
Assistant Examiner—James J. Seidleck
Attorney, Agent, or Firm—Charles E. Brown

[57] ABSTRACT

This disclosure relates to a plastic bottle having a bottom structure of the champagne bottle type. The bottom is reinforced by radiating ribs which are circumferentially spaced and the ribs, utilizing a minimum of material, stiffen the bottom so as to prevent the domed inner section of the bottom from reverting and also greatly resist creep of the bottom under the influence of time and internal pressure. The ribs may be only across the juncture section between inner and outer sections of the bottom, or may extend entirely from the outer section across the juncture section and substantially to the domed center of the domed section. The ribs may also be upstanding and serve to function as guides for a liquid product being placed into the bottle so as to reduce turbulences and aid in expediting the filling operation.

7 Claims, 8 Drawing Figures

U.S. Patent   Jun. 25, 1985   Sheet 1 of 2   4,525,401
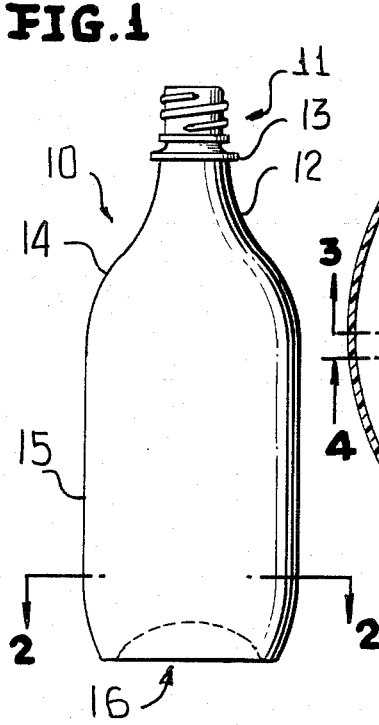
FIG.1
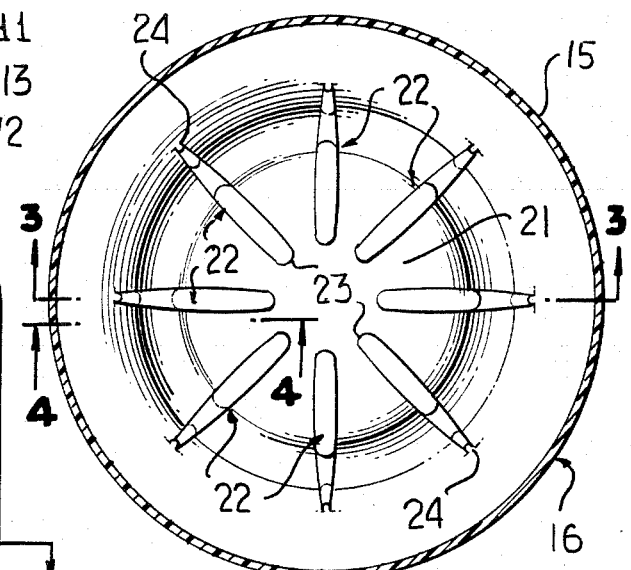
FIG.2
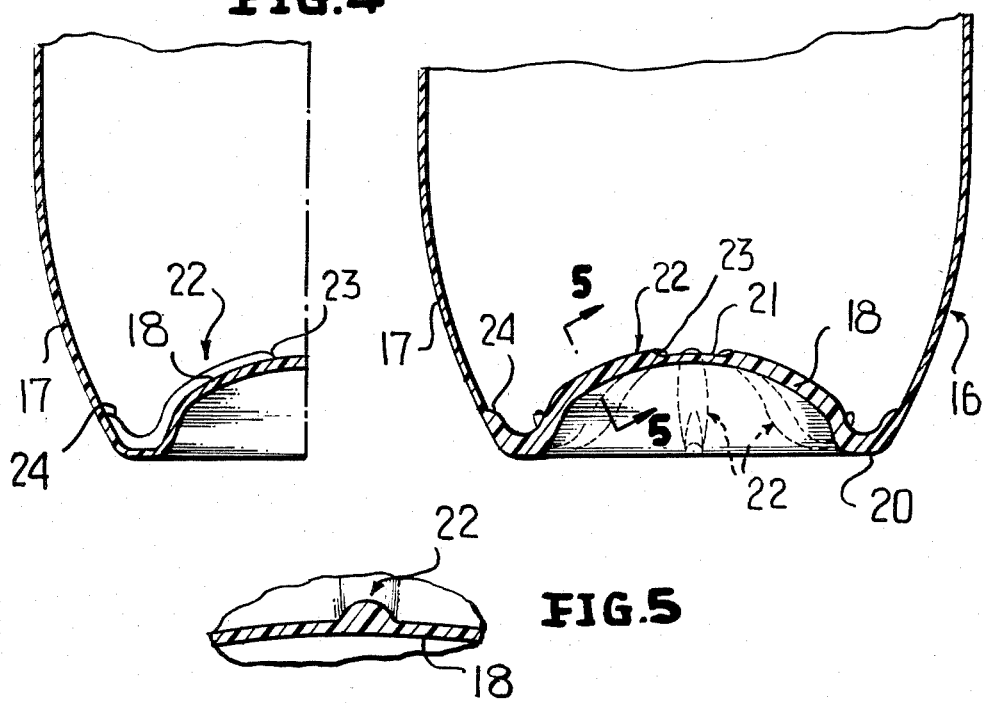
FIG.4   FIG.3
FIG.5

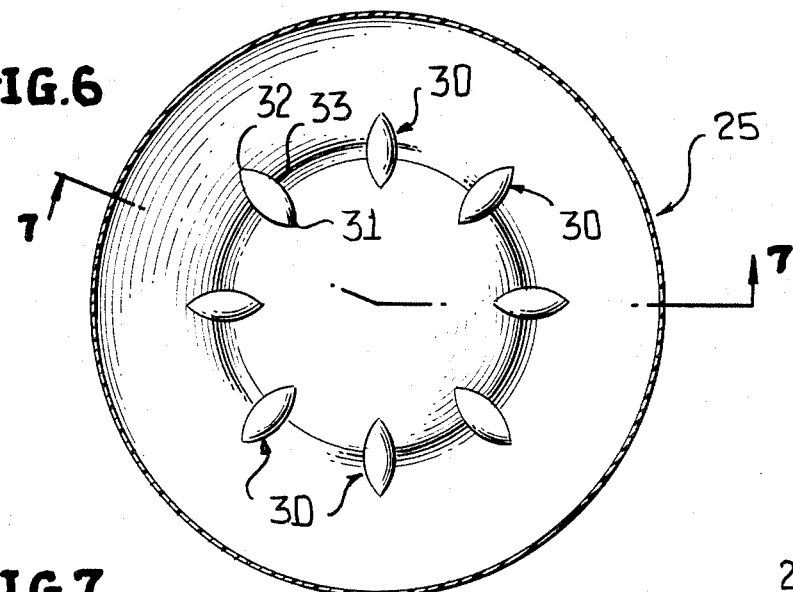
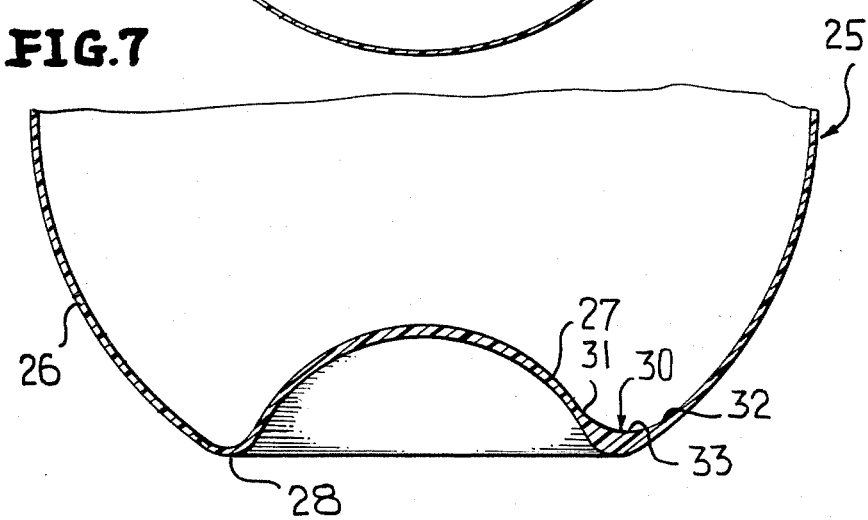
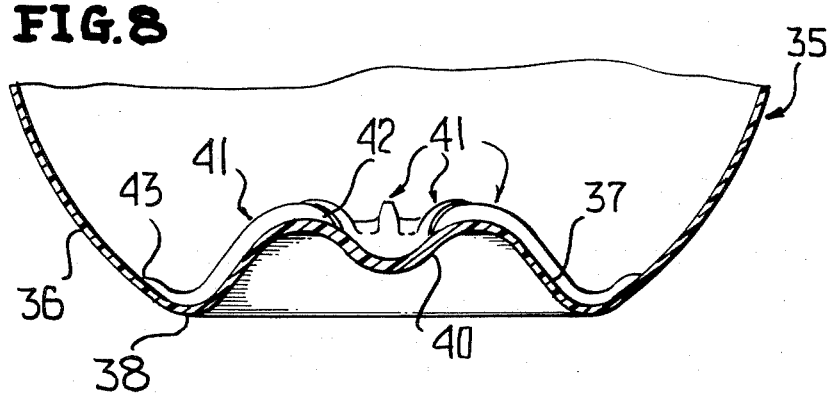

PLASTIC CONTAINER WITH INTERNAL RIB REINFORCED BOTTOM

This invention relates in general to new and useful improvements in plastic bottles, and more particularly to the reinforcement of the bottom of plastic bottles having so-called champagne bottle bottom structures.

In the construction of plastic bottles of the socalled champagne bottom type which incorporates an inverted dome connected at its base to the lower edges of the side wall of the bottom, the problem is that inevitably in the blow molding process the juncture area between the base of the inverted dome and the sidewall stretches and becomes thinned out. Also, this juncture area is subjected not only to tensile stresses but to severe dome load since the inverted dome tends to revert from generally hemispherical shape into what is commonly known as a bulged bottom and the bottom becomes a rocker in that it will not stand up straight. In the juncture area the compressive stresses on the domed section are changed to tensile stresses and to flexural (bending) stresses. Since plastic material is weakest in tension, the critical tensile stresses are reached first, and they are followed by critical flexural stresses before critical compressive stresses develop.

The foregoing weeaknesses of champagne type bottoms in plastic bottles have been recognized in the past, and reference is made to U.S. Pat. No. 3,881,621 granted July 2, 1973 to Domas Adomaitis. This patent proposes to solve the inherent weakness problem of champagne type bottoms in plastic bottles by reinforcing the juncture section by way of an internal circumferential rib or reinforcing ring.

While the continuous reinforcing ring does generally solve the problem, in order that the flexure across all of the affected area may be restricted, it is necessary that the reinforcing ring be somewhat larger than that shown in the Adomaitis patent, and as a result considerable material is required in the formation of the reinforcing ring. Unfortunately, the amount of material used in a plastic bottle is critical from a commercial standpoint in that plastic bottles must, of necessity, be economically competitive with other types of containers.

It has been found in accordance with this invention that the necessary reinforcement can be obtained with a minimum of extra material if the reinforcement is by way of radiating ribs. It has also been found that the ribs may be readily incorporated in the bottle bottom by forming the preform from which the bottle is formed with axially extending ribs which may be readily stripped from the associated core required in the injection molding of such preforms.

The radial extent of the ribs may be varied, although it has been found that basically the best reinforcement is obtained when the ribs extend from the partspherical downwardly sloping part of the bottom across the juncture section and up the domed portion of the bottle, terminating in spaced relation to the actual dome of the domed portion. On the other hand, it is also feasible to restrict the ribs substantially to the juncture section.

It has also been found that it may be economically feasible to form the ribs of more material so that the ribs are upstanding and therefore are in the path of a liquid product being placed within the bottle. The ribs provide for suitable guidance of the liquid product so as to hold turbulence in the liquid to a minimum and thereby facilitate rapid filling.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is an elevational view of a plastic bottle formed in accordance with this invention.

FIG. 2 is an enlarged horizontal sectional view taken generally along the line 2—2 of FIG. 1, and shows the bottom structure in plan and most specifically illustrates the arrangement of the ribs.

FIG. 3 is a fragmentary vertical sectional view taken generally along the line 3—3 of FIG. 2, and shows generally the cross section of the ribs.

FIG. 4 is a fragmentary vertical sectional view taken generally along the line 4—4 of FIG. 2, and shows a typical rib in elevation.

FIG. 5 is an enlarged sectional view transversely of one of the ribs, taken along the line 5—5 of FIG. 3, and shows a typical rib cross section.

FIG. 6 is a transverse sectional view taken through the bottom of a modified bottle, and shows a modified rib arrangement.

FIG. 7 is an axial sectional view taken generally along the line 7—7 of FIG. 6, and shows the cross section of the bottom and the location of the ribs therein.

FIG. 8 is another fragementary vertical sectional view similar to FIG. 3, and shows still another form of rib configuration.

Referring now to the drawings in detail, it will be seen that there is illustrated in FIG. 1 a typical bottle formed of plastic material and including a champagne type bottom in accordance with this invention. The bottle is generally identified by the numeral 10 and the proportions of the bottle are those of one generally of a one liter capacity. The proportions of the bottle 10 in no way have anything to do with this invention. The bottle 10, merely for identification purposes, includes a threaded neck finish 11, a neck 12 having an outwardly directed support flange 13, a flaring shoulder area 14, and a generally cylindrical body 15. The body 15 terminates at its lower end in a champagne-type bottom generally identified by the numeral 16.

Referring now to FIG. 3, it will be seen that the bottom 16 includes an outer preferably part-spherical section 17 which is joined to the lower end of the body 15. The bottom 16 also includes an inner domed section 18 which is joined to the outer section 17 by a juncture section 20. The domed section 18, by the very nature of the formation of the bottle 10, includes an uppermost dome portion 21 which is normally of a thicker configuration than the remainder of the domed section 18.

The above described bottom 16 is a typical champagne-type bottom and as described above is under high internal pressures within the bottle 10, such as exist when the liquid product is a carbonated beverage, applying high force on the domed section 18 urging the domed section 18 to revert so that the bottom will assume a generally hemispherical configuration. Further, since the bottles are intended to have a shelf life and there is a creep factor involved, there is a further tendency of the bottom structure to deform under the influence of time and pressure. Such gradual deformation of the bottom does not necessarily detract from a standpoint of either appearance or structural strength, but increases the volume of the bottle with the result that the fill line in the bottle drops and the bottle gives the general appearance of not having been completely filled.

It is therefore highly desirable that the bottom 16 be reinforced so that the configuration of the bottom remains substantially stable. It is also necessary that the amount of material used in obtaining such reinforcement be held to a minimum, otherwise the cost of reinforcement will exclude the bottle from a commercial competition standpoint.

In accordance with this invention, it is proposed to reinforce the bottom 16 by providing on the internal surface of the bottom a plurality of circumferentially spaced radiating ribs 22, as is best shown in FIG. 2. Preferably there will be eight ribs, as shown, although this number could be obviously varied depending upon rib size, bottle size, etc. Each of the ribs, as is best shown in FIGS. 2 and 4, extends from the lower part of the outer section 17 across the juncture section 20 and then across the domed section 18 to a point spaced from but adjacent to the domed portion 21. Each rib 22, as is best shown in FIG. 5, is preferably of a rounded cross section, broadly speaking the cross section of one-half of an oval or ellipse.

It is to be noted also that the ribs 22 are of a generally streamlined configuration having a rounded radially inner nose portion 23 and rapidly increasing in width therefrom and thereafter gradually tapering toward a tail end 24. The configuration of the ribs 22 is as a result of the stretching of the plastic material in the blow molding formation of the bottom 16. However, the rib configuration illustrated in FIG. 2 has produced highly desirable results. In a bottom structure weighing on the order of 12–13 grams the addition of one-half gram of material for the ribs 22 has been found sufficient to cure deficiencies of previously formed identical appearing bottles without the ribs.

Reference is now made to FIGS. 6 and 7 wherein a modified bottom structure, generally identified by the numeral 25, is illustrated. The bottom structure 25, like the bottom 16, is of the champagne bottle type and includes an outer part-spherical section 26 and an inverted inner section 27 which are joined together by a juncture section 28. The bottom 25 is reinforced by a plurality of radially extending ribs 30. However, as is clearly shown in FIGS. 6 and 7, the ribs 30 extend substantially only in the area of the juncture section 28 although, as is clearly shown in FIG. 6, end portions of the ribs do extend into overlying relation to both the outer section 26 and the inner section 27.

The ribs 30, like the ribs 22, are eight in number, and while it is thought that this is perhaps the best number, other numbers of ribs will suffice.

Each of the ribs 30 is of a generally streamlined configuration and each rib 30 has a generally pointed inner end 31 and a like pointed or rounded outer end 32 with a widest portion 33 in the longitudinal center thereof. Each rib 30 is also of a rounded cross section such as generally shown with respect to the rib 22 in FIG. 5, although basically speaking the ribs 30 may be flatter than the ribs 22 in proportion to their height.

Reference is now made to FIG. 8 wherein yet another form of bottom structure, generally identified by the numeral 35, is shown. The bottom structure 35 includes an outer part-spherical section 36 and an inner domed section 37. The sections 36 and 37 are joined by a juncture secton 38. The illustrated domed inner section 37 has the central portion thereof further inverted so that it has a downwardly extending central part 40. It is feasible, however, that the domed inner section 37 be a full dome as shown in FIGS. 3 and 7.

The bottom 35 is reinforced by a plurality of radiating ribs, each generally identified by the numeral 41. The ribs 41 are more pronounced than the ribs 22 and 30 and are upstanding as is clearly evidenced from FIG. 8. The ribs 41 are generally rectangular in cross section and have rounded decreasing height inner ends 42 and outer ends 43. It is to be noted that the ribs 41 extend partially up the inner bottom section 36 and from there across the juncture section 38 and into the central portion 40 of the domed inner section 37.

In the illustrated embodiment of the invention there are but six of the ribs 41. However, it is to be once again understood that the number of ribs may be varied in accordance with the stiffening requirements of the bottle.

The ribs 41, in contradiction to the ribs 22 and 30, require a considerable amount of plastic material in the formation thereof. However, the ribs 41 are not intended solely for the purpose of reinforcing the bottom against reverting of the domed inner section 37. It has been found that the ribs 41 materially aid in the flow of a liquid product into the bottle so that turbulences are greatly reduced and thus the filling of the bottle with the ribs 41 may be greatly expedited. It may well be that the time saved in the filling operation will more than compensate for the slightly added cost of the additional material required for the ribs 41 as compared with that required for the ribs 22. Further, it is to be noted that with the greater stiffness afforded by each of the ribs 41, the number, as indicated above, has been reduced from eight to six, thereby providing for some equalization in the amount of material required.

Although only several embodiments of the ribbed bottom reinforcement have been illustrated and described herein, it is to be understood that minor variations may be made in the bottom structures without departing from the spirit and scope of the invention as defined by the appended claims.

What is claimed as new is:

1. A bottom structure of a thermoplastic bottle, said bottom structure comprising an outer bottom portion having a radially inner lower edge, an inner generally radially and axially concaved bottom portion disposed within said outer bottom portion in recessed relation and having a radially outer lower edge, and a continuous annular generally arcuate cross-sectional intermediate bottom portion joining the lower edges of said outer bottom portion and said inner bottom portion; the improvement of means reinforcing said continuous intermediate bottom portion against deflection, said means being in the form of a plurality of circumferentially spaced radiating solid ribs formed on an interior surface of said bottom structure and extending at least generally across said continuous intermediate bottom portion, each of said ribs having end portions terminating respectively in said outer bottom portion and said inner bottom portion, said inner bottom portion including an uppermost thickened dome, and said inner ends of said ribs terminating adjacent said dome.

2. A bottom structure of a thermoplastic bottle, said bottom structure comprising an outer bottom portion having a radially inner lower edge, an inner generally radially an axially concaved bottom portion disposed within said outer bottom portion in recessed relation and having a radially outer lower edge, and a continuous annular generally arcuate cross-sectional intermediate bottom portion joining the lower edges of said outer bottom portion and said inner bottom portion; the improvement of means reinforcing said continuous intermediate bottom portion against deflection, said means being in the form of a plurality of circumferentially spaced radiating solid ribs formed on an interior surface of said bottom structure and extending at least generally across said continuous intermediate bottom portion, each of said ribs having end portions terminating respectively in said outer bottom portion and said inner bottom portion, said inner bottom portion including an uppermost thickened dome, and said inner ends of said ribs terminating in said dome in spaced adjacent relation.

3. A bottom structure of a thermoplastic bottle, said bottom structure comprising an outer bottom portion having a radially inner lower edge, an inner generally radially and axially concaved bottom portion disposed within said outer bottom portion in recessed relation and having a radially outer lower edge, and a continuous annular generally arcuate cross-sectional intermediate bottom portion joining the lower edges of said outer bottom portion and said inner bottom portion; the improvement of means reinforcing said continuous intermediate bottom portion against deflection, said means being in the form of a plurality of circumferentially spaced radiating solid ribs formed on an interior surface of said bottom structure and extending at least across said continuous intermediate bottom portion, each rib being generally tear drop shape in plan and having a rounded nose terminating in said inner bottom portion.

4. A bottom structure of a thermoplastic bottle, said bottom structure comprising an outer bottom portion having a radially inner lower edge, an inner generally radially and axially concaved bottom portion disposed within said outer bottom portion in recessed relation and having a radially outer lower edge, and a continuous annular generally arcuate cross-sectional intermediate bottom portion joining the lower edges of said outer bottom portion and said inner bottom portion; the improvement of means reinforcing said continuous intermediate bottom portion against deflection, said means being in the form of a plurality of circumferentially spaced radiating solid ribs formed on an interior surface of said bottom structure and extending at least generally across said continuous intermediate bottom portion, each rib being generally elongated oval in plan.

5. A bottom structure of a thermoplastic bottle, said bottom structure being of the type including an inner generally radially and axially concaved bottom portion disposed in recessed relation with respect to the remainder of said bottom structure and being surrounded by a continuous generally arcuate cross-sectional lowermost bottom portion; the improvement of means reinforcing said continuous lowermost bottom portion against deflection, said means being in the form of a plurality of circumferentially spaced radiating solid ribs formed on an interior surface of said bottom structure and extending at least generally across said continuous lowermost bottom portion, and said ribs terminating in said bottom structure, said inner bottom portion including an uppermost thickened dome, and inner ends of said ribs terminating adjacent said dome.

6. A bottom structure of a thermoplastic bottle, said bottom structure being of the type including an inner generally radially and axially concaved bottom portion disposed in recessed relation with respect to the remainder of said bottom structure and being surrounded by a continuous generally arcuate cross-sectional lowermost bottom portion; the improvement of means reinforcing said continuous lowermost bottom portion against deflection, said means being in the form of a plurality of circumferentially spaced radiating solid ribs formed on an interior surface of said bottom structure and extending at least generally across said continuous lowermost bottom portion, and said ribs terminating in said bottom structure, each rib being generally tear drop shape in plan and having a rounded nose terminating in said inner bottom portion.

7. A bottom structure of a thermoplastic bottle, said bottom structure being of the type including an inner generally radially and axially concaved bottom portion disposed in recessed relation with respect to the remainder of said bottom structure and being surrounded by a continuous generally arcuate cross-sectional lowermost bottom portion; the improvement of means reinforcing said continuous lowermost bottom portion against deflection, said means being in the form of a plurality of circumferentially spaced radiating solid ribs formed on an interior surface of said bottom structure and extending at least generally across said continuous lowermost bottom portion, and said ribs terminating in said bottom structure, each rib generally elongated oval in plan.

* * * * *